(12) United States Patent
White

(10) Patent No.: US 8,910,231 B2
(45) Date of Patent: Dec. 9, 2014

(54) SYSTEM AND METHOD FOR CONFIGURING MEDIA SERVICES

(75) Inventor: Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 2018 days.

(21) Appl. No.: 11/754,809

(22) Filed: May 29, 2007

(65) Prior Publication Data

US 2008/0298388 A1 Dec. 4, 2008

(51) Int. Cl.
| | |
|---|---|
| *H04N 7/173* | (2011.01) |
| *G06F 15/16* | (2006.01) |
| *H04N 21/4782* | (2011.01) |
| *H04N 21/472* | (2011.01) |
| *H04L 29/08* | (2006.01) |
| *H04N 7/16* | (2011.01) |
| *H04L 29/06* | (2006.01) |
| *H04N 21/443* | (2011.01) |
| *H04N 21/4227* | (2011.01) |
| *H04N 21/426* | (2011.01) |
| *H04N 21/482* | (2011.01) |
| *H04N 21/485* | (2011.01) |
| *H04N 7/20* | (2006.01) |
| *H04J 3/22* | (2006.01) |

(52) U.S. Cl.
CPC ........ *H04L 65/4076* (2013.01); *H04N 21/4782* (2013.01); *H04N 21/472* (2013.01); *H04L 67/303* (2013.01); *H04N 7/163* (2013.01); *H04N 21/4432* (2013.01); *H04N 21/4227* (2013.01); *H04N 21/42684* (2013.01); *H04N 21/482* (2013.01); *H04N 21/4858* (2013.01)
USPC ........... 725/132; 725/80; 725/116; 705/14.36

(58) Field of Classification Search
USPC ............ 725/132, 113, 140, 80, 116; 709/228; 705/56, 30, 14.27, 14.36; 713/1, 100, 713/191, 300; 455/435.1
See application file for complete search history.

(56) References Cited

U.S. PATENT DOCUMENTS

| | | | | |
|---|---|---|---|---|
| 6,618,858 | B1 * | 9/2003 | Gautier | 725/132 |
| 2005/0212504 | A1 * | 9/2005 | Revital et al. | 324/100 |
| 2005/0289539 | A1 * | 12/2005 | Krishna | 717/177 |
| 2007/0220553 | A1 * | 9/2007 | Branam et al. | 725/46 |
| 2007/0294737 | A1 * | 12/2007 | Edwards et al. | 725/112 |
| 2008/0127255 | A1 * | 5/2008 | Ress et al. | 725/38 |
| 2008/0298388 | A1 * | 12/2008 | White | 370/468 |
| 2009/0253424 | A1 * | 10/2009 | Owen et al. | 455/419 |
| 2009/0271830 | A1 * | 10/2009 | White | 725/86 |
| 2010/0071020 | A1 * | 3/2010 | Addington et al. | 725/132 |
| 2010/0287582 | A1 * | 11/2010 | Barnett, Jr. | 725/25 |

* cited by examiner

*Primary Examiner* — Pankaj Kumar
*Assistant Examiner* — Reuben M Brown
(74) *Attorney, Agent, or Firm* — Guntin & Gust, PLC; Joseph Hrutka

(57) ABSTRACT

A system and method for configuring media services is disclosed. A system that incorporates teachings of the present disclosure may include, for example, a portal having a controller element to detect an installation of an Internet Protocol Television (IPTV) media receiver in an IPTV media system and adapt at least a portion of the portal according to the installation. Other embodiments are disclosed.

30 Claims, 5 Drawing Sheets

Portable Communication Devices

SYSTEM AND METHOD FOR CONFIGURING MEDIA SERVICES

FIELD OF THE DISCLOSURE

The present disclosure relates generally to media services and more specifically to a system and method for configuring media services.

BACKGROUND

With the advent of Internet Protocol TV (IPTV), consumers may receive and manage media programming functions such as video and/or music on demand from an IPTV set-top box (STB) receiver, computer, digital telephone system, or other computing device. The IPTV STB receiver can also be used for digital video recording (DVR) and to management personal media files such as picture albums and family movies. IPTV devices, however, are not readily manageable when the consumer is in transit.

A need therefore arises for a system and method for configuring media services.

DETAILED DESCRIPTION

Broadly stated, embodiments in accordance with the present disclosure provide a system and method for configuring media services.

In a first embodiment of the present disclosure, a computer-readable storage medium can have computer instructions for detecting an installation of a media receiver in a Internet Protocol Television (IPTV) media system, and directing a portal responsive to said detected installation to create a derivative account.

In a second embodiment of the present disclosure, a portal can have a controller element to detect an installation of a media receiver in an IPTV media system and adapt at least a portion of said portal according to said installation.

In a third embodiment of the present disclosure, an IPTV media receiver can have a controller element to generate a notice of installation for a portal to adapt to an installation of the IPTV media receiver.

In a fourth embodiment of the present disclosure, a gateway can have a controller element to submit a notice of installation associated with an IPTV media receiver coupled to the gateway for a portal to adapt to the installation.

Figure 1:
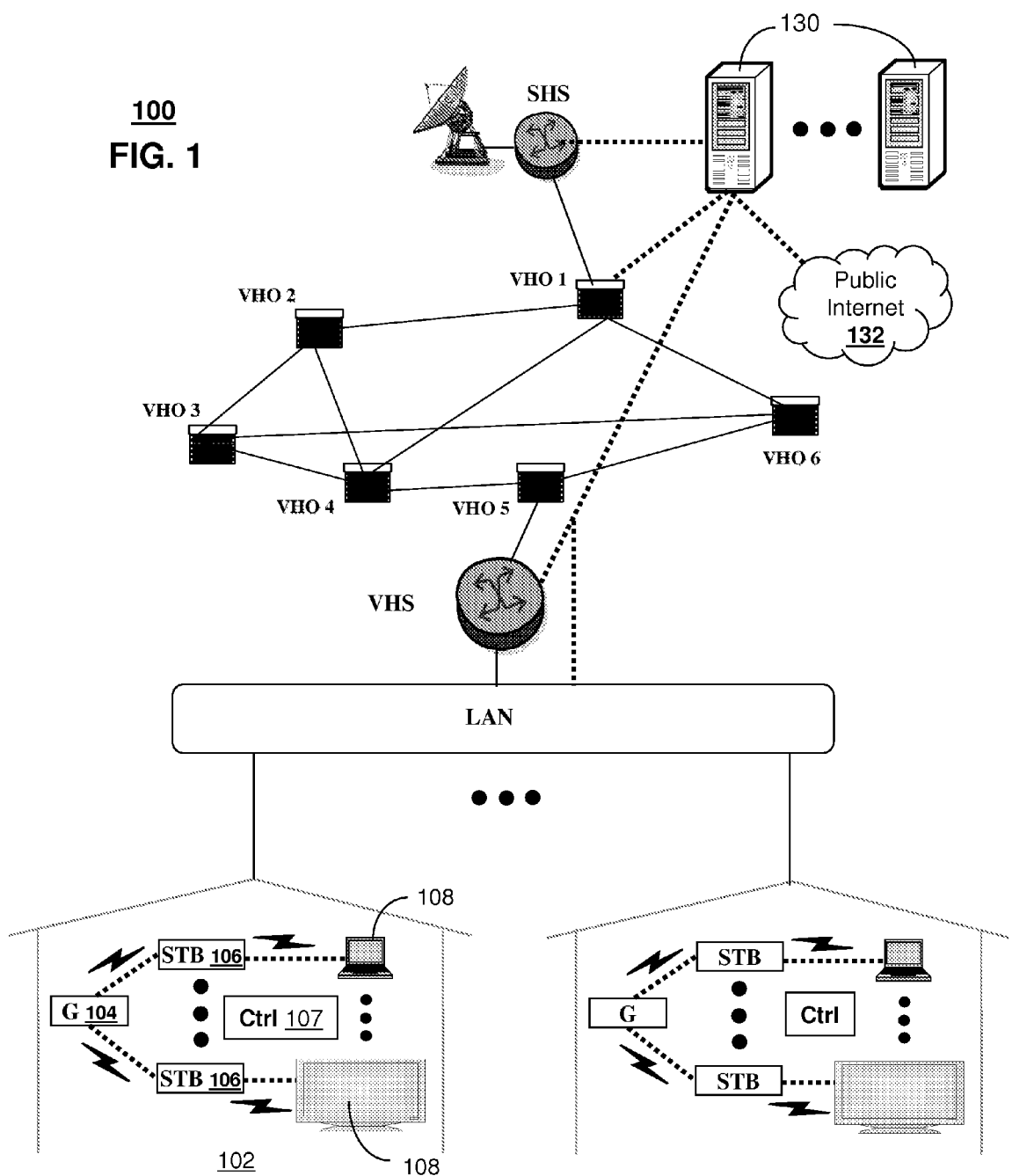
FIG. 1 depicts an exemplary embodiment of an Internet Protocol TV (IPTV) media system.

FIG. 1 depicts an exemplary embodiment of an IPTV media system 100. In a typical IPTV infrastructure, there is at least one super head office server (SHS) which receives national media programs from satellite and/or media servers from service providers of multimedia broadcast channels. The SHS server forwards IP packets associated with the media content to video head servers (VHS) via a network of video head offices (VHO) according to a common multicast communication method. The VHS then distributes multimedia broadcast programs to commercial and/or residential buildings 102 housing a gateway 104 (e.g., a residential gateway or RG). The gateway 104 distributes broadcast signals to media receivers 106 such as Set-Top Boxes (STBs) which in turn present broadcast selections to media devices 108 such as computers or television units managed in some instances by a media controller 107 (e.g., an infrared or RF remote control).

Unicast traffic can also be exchanged between the media receivers 106 and subsystems of the IPTV media system 100 for services such as video-on-demand (VoD). Although not shown, the aforementioned multimedia system can also be combined with analog or digital broadcast distributions systems such as cable systems.

Figure 2:
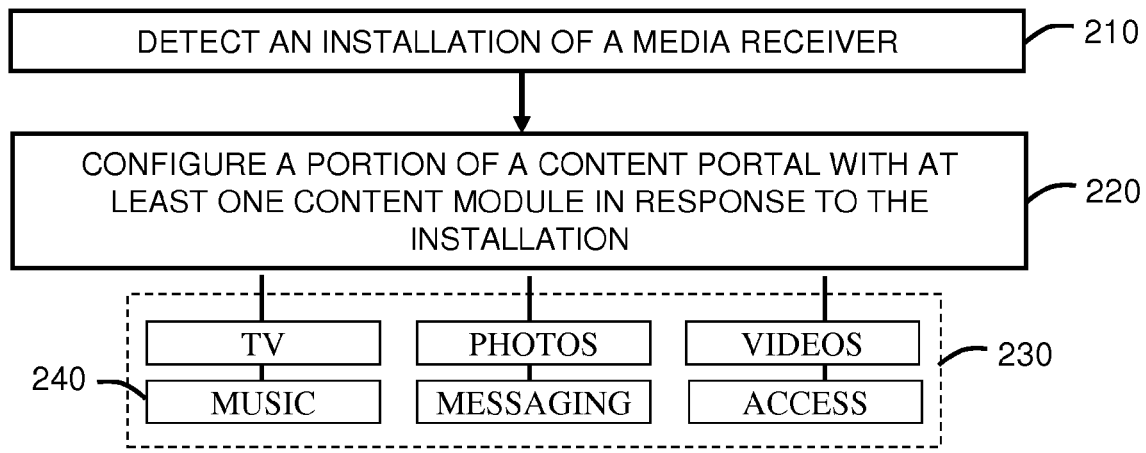
FIG. 2 depicts an exemplary method operating in portions of the IPTV media system.
Figure 3:
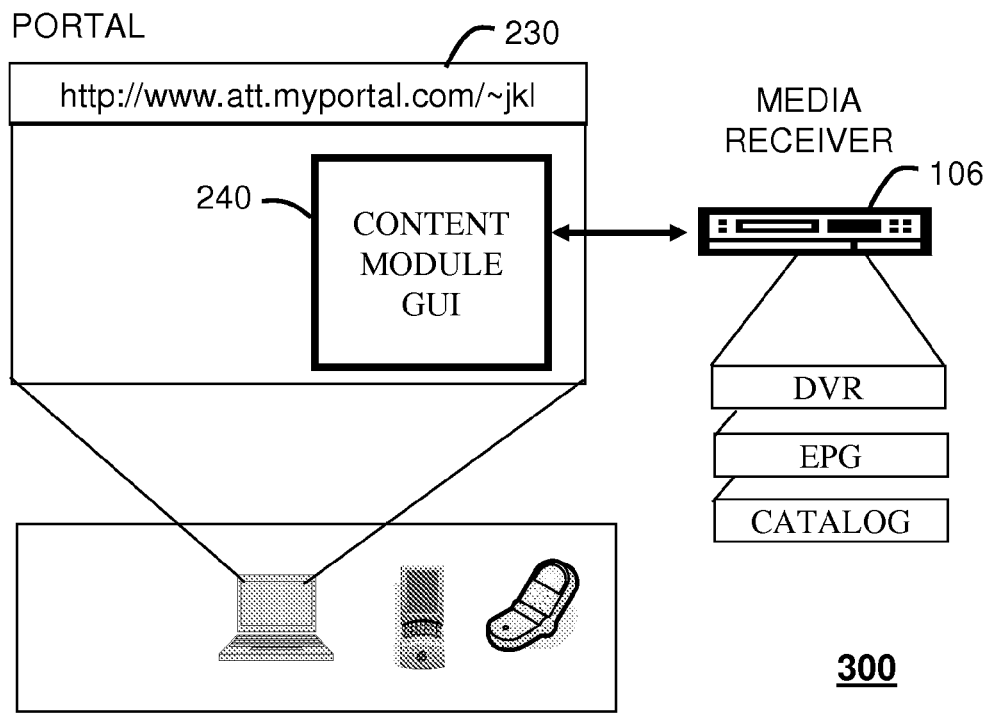
FIG. 3 depicts an exemplary embodiment of a portal of the IPTV media system.

Referring to FIG. 2, a method 200 is depicted for adapting a portal 230 (see also FIG. 3) of the IPTV media system 100 responsive to an installation of a media receiver 106 in said system. It should be noted that the method 200 can be practiced with more or less steps than those shown. The portal 230 can be a website managed by the service provider of the IPTV media system 100 or by a third-party contracted by said service provider (e.g., google.com, etc.). The portal 230 can be publicized by common web services means operating in the computing system 130 of FIG. 1. The computing system 130 can be a common web server interconnected at various subsystems of the IPTV media system 100 shown in FIG. 1, and accessible by the public internet 132 of an internet service provider (ISP).

The portal 230 can be programmed to establish a derivative account for each subscriber of the IPTV media system 100. Each derivative account can be selectively managed by subscribers using a unique login and password. The derivative account provides each subscriber of the IPTV media system 100 a customizable web access account which can be accessed from the public internet 132 using internet-capable communication devices such as cell phones and computers while in building 102, or while in transit using wireless communication techniques (e.g., WiMAX, WiFi, software defined radio, cellular communications such as CDMA EV/DO, GSM GPRS, UMTS, and so on).

With these principles in mind, in step 210, a subsystem of the IPTV media system 100 can be programmed by common means to detect an installation of the media receiver 106 in building 102. A subsystem of IPTV media system 100 in the present context can mean one or more network elements shown in the IPTV network of FIG. 1 (e.g., SHS, VHO, VHS, or LAN), portions of computing system 130, the gateway 104, the media receiver 106 being installed, or portions of combinations thereof.

For example, when a user first installs the media receiver 106 in building 102, the gateway 104 can determine that a new media receiver has been added to its network after power cycling said receiver. The gateway 104 can be programmed to then inform the portal 230 of said installation by transmitting an installation notice to computing system 130. For purposes of illustration, references made about the portal 230 such as in the preceding sentence will by definition infer the use of computing system 130. In another arrangement, the media receiver 106 can detect and report a self-installation to the gateway 104 or the portal 230. In yet another arrangement, the portal 230 can be programmed to detect the installation of the media receiver 106 by polling gateways 104 in buildings 102 for updates to their network.

At step 220, the computing system 130 can be programmed to automatically configure the portal 230 with a content module 240 in response to the installation detected in step 210. Alternatively, the portal 230 can be adapted with one or more content modules 240 as directed by the media receiver 106, the gateway 104, or any other subsystem of the IPTV media system 100. From these various embodiments, it would be evident to an artisan of ordinary skill in the art that adaptation of one or more derivative accounts of the portal 230 can be managed by the portal, by one or more other subsystems of the IPTV media system 100, or combinations thereof.

A content module 240 can be selected by the portal 230 from a group of content modules stored in its database or some other storage device in the IPTV media system 100. Content modules can serve the purpose of managing one or more functions of the media receiver 106, one or more accessories coupled to the media receiver (e.g., DVR, audio system, lighting system, etc.), and/or one or more services supplied from or to the media receiver. A content module can represent a specialized graphical user interface (GUI) in the form of selectable hypertext or a GUI button included in a general GUI (e.g., home page) of a derivative account of the portal 230. In the case where two or more subscribers are associated with the newly installed media receiver 106 (e.g., two or more users sharing an STB in a multi-user household), one or more content modules 240 can be added to the derivate accounts created by the portal 230 for each subscriber.

A content module 240 can represent a group of computer instructions operated by the portal 230 to control for example a built-in DVR function of a media receiver 106. The content module 240 in this instance can provide the subscriber of the media receiver 106 a GUI interface with selectable GUI controls for managing DVR functions remotely via their derivative portal account.

In another embodiment, a content module 240 can be used for managing personal media (e.g., family pictures or videos, etc.) stored in the media receiver 106 by way of a GUI interface. Yet another content module 240 can have a GUI with selectable controls for managing music files stored in the media receiver 106 or an accessory coupled thereto. The GUIs of these content modules can provide additional controls for configuring file sharing privileges between subscribers. Another content module 240 can have a GUI with selectable controls for viewing an electronic programming guide (EPG), viewing video on demand (VoD) or music on demand (MoD) catalogs and selecting one or more media programs for later viewing, adjusting parental controls, or managing other services supplied to or by the media receiver 106.

In summary, a repository can be created to store any number of content modules 240 at the portal 230 or in a storage device of another subsystem in the IPTV media system 100. The portal 230 can thus present in step 220 one or more content modules 240 selected from this repository in the derivative account of the subscriber for the purposes of providing subscribers remote access for controlling and managing operations of any media subsystem in building 102 without physical co-location required. The content modules 240 can be predefined to address interoperability issues between different models of media receivers 106 and accessories coupled thereto. The gateway 104 can be configured to provide secure access to the portal 230 using a designated port for portal access, or an SSL, VPN, or like secure connection to the gateway.

A content module 240 therefore can provide configuration access to an underlying media function, operation, or service. The content modules 240 presented in a derivative account by the portal 230 offer a portable communication device (e.g., laptop, PDA, cell phone) accessing the portal through the public internet 132 direct, two-way, real-time interactions with media subsystems, such as a set-top box of a home entertainment system.

A service provider of the portal 230 can therefore offer derivative accounts to manage telephone, IPTV, broadband, Internet, or cable services supplied by the IPTV media system 100. The service provider of the portal 230 can be a media broadcast distributor (e.g. AT&T, Comcast) of IPTV media system 100 or a contracted third-party portal provider (e.g. Google, etc.). A content module 240 as noted earlier can be automatically configured and placed in a user's derivative portal account in response to an installation of the media receiver 106, or detection of an accessory (e.g., DVR) coupled to the media receiver 106. The self-adaptation of the portal 230 removes the cumbersome task of requiring subscribers to manually configure their portal derivative account for remote management of the media subsystems in building 102.

Figure 4:
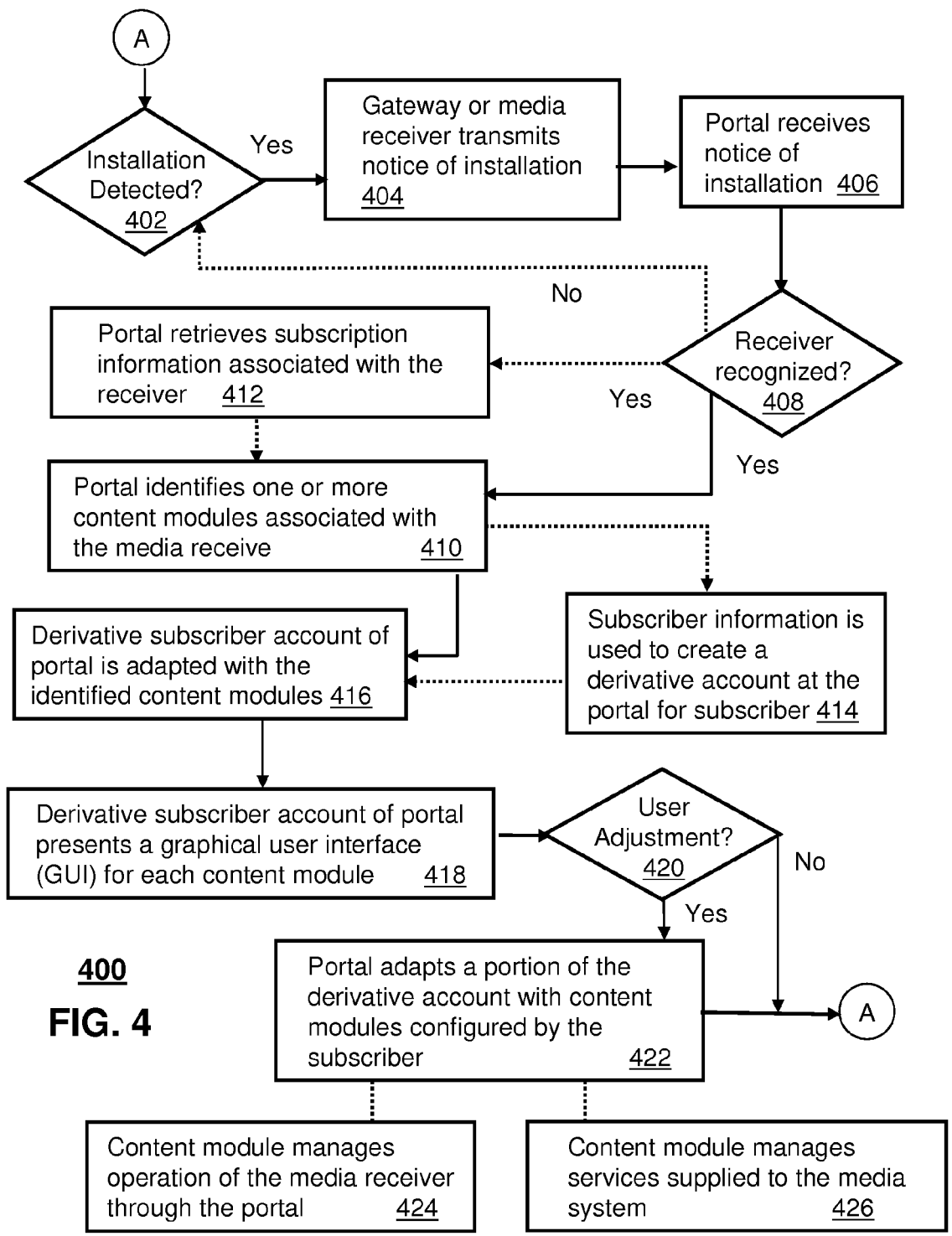
FIGS. 4-5 depicts other exemplary methods operating in portions of the IPTV media system.

Referring to FIG. 4, a method 400 for directing a configuration of at least a portion of the portal 230 is presented. Method 400 begins with step 402 in which one among a gateway 104, computing system 130, or portal 230 detect an installation of a media receiver 106 in building 102. Alternatively, the media receiver 106 being installed can proactively partake in the detection step by generating a self-aware installation notice. In yet another arrangement, the portal 230 polls the gateway 104 or the media receiver 106 for installation status information. At step 404, the gateway 104 or the media receiver 106 transmits an installation notice to the portal 230.

At step 406, the portal 230 can report the installation to systems managing the content modules, provisioning systems of IPTV media system 100, and/or other subsystems of the media system requesting notification of a detected installation. Once the notice of installation has been received, at step 408, the portal 230 checks whether it recognizes the media receiver 106. The notice of installation can include an identification of the media receiver 106 along with subscription information associated with a service supplied by, or to, the media receiver 106 along with accessories detected by the media receiver that can be controlled thereby. The identification can be a serial number, a physical address, a MAC address, a model number, an encrypted code, or any other signature mark of the media receiver 106 and accessories coupled thereto. If the media receiver 106 is not recognized according to the aforementioned identification data or subscriber information, the portal 230 ignores the request and proceeds to step 402 where it awaits for notices of installation from other devices.

Upon recognizing the media receiver 106, at step 410, the portal 230 can identify one or more content modules 240 compatible with the media receiver 106, services associated therewith, and accessories coupled thereto. For example, a content module 240 can be selected by the portal 230 for controlling DVR functions of the media receiver 106 as previously mentioned. Another content module 240 can be selected by the portal 230 for managing personal media files. Yet another content module 240 can be selected by the portal 230 for viewing EPG, VoD and MoD catalogs, and so on.

In one embodiment, at step 412, the portal 230 can also retrieve subscription information when none is provided by the media receiver 106. The subscription information can be retrieved from a provisioning system of the IPTV media system 100 that manages and records media services subscribed to by each user of the media receiver 106. For illustration purposes, said provisioning system can operate as yet another functional component of computing system 130. The subscriber information can identify services currently available or offered to the media receiver 106. In another embodiment, at step 414, the account provisioning system can direct the portal 230 to create the derivative account based on known subscriber information. The subscriber account can identify the subscriber and any services or features to which the subscriber has subscribed.

At step 416, the portal 230 can be adapted with the one or more content modules identified in step 410 responsive to the detected installation. At step 418, the portal 230 can be programmed to present one or more GUI elements for each content modules 240 selected in step 410. Based on user preferences supplied by the subscriber or subscriber interactions detected by the portal 230 while the subscriber browses his or her account, the portal can be directed to remove, replace, or modify at least one of the content modules 240 configured automatically by the portal. The portal 230 can also receive a directive from the subscriber to add other content modules 240 selected by said subscriber from the portal as optional content modules. These content modules can be modules not automatically installed, but which the subscriber can select form a drop down menu presented by the portal 230 to augment features to remotely access and manage the media receiver 106, accessories coupled thereto, or other subsystems of IPTV media system 100.

Moreover, some content modules can be customized in steps 420-422 by the subscriber if desired by common GUI controls supplied with said modules for adaptation according to user preferences. The subscriber can for example configure one or more of the content modules 240 according to adjustable settings, services, or features supplied by the content module. In another arrangement, the portal 230 can customize the content module 240 for presentation on different portable communication devices of the subscriber. For example, the portal 230 can be programmed to present a content module 240 with a different look and feel on a cell phone than on a laptop computer to accommodate differences in display size and controls.

At step 422, the portal 230 is adapted with the content modules configured by the subscriber. The adaptation of the portal 230 can result from the content modules added in step 416 being removed, modified or supplemented with new content modules selected by the subscriber. In yet another arrangement, the portal 230 can support detachable GUIs associated with the content modules 240 thereby allowing the subscriber to move said modules around in a web page of the subscriber's account. In this embodiment, the subscriber can customize their home web page.

From step 422, the portal 230 can provide a subscriber in step 424 remote access to operations of the media receiver 106 with the content module 240. An operation of the media receiver 106 can include broadcast channel programming, electronic program guide (EPG) viewing, media program catalog processing, media file processing, media on demand programming, parental control programming, and digital video recorder (DVR) programming, among other operational features.

The content modules 240 can also manage in step 426 services supplied by the IPTV media system 100 to the media receiver 106, and/or one or more accessories coupled to the media receiver. For example, an accessory may be a portable music player, handheld personal digital assistant, home stereo, fax machine, or copier. A content module can be supplied in the portal 230 for each accessory managed through the media receiver 106.

Figure 5:
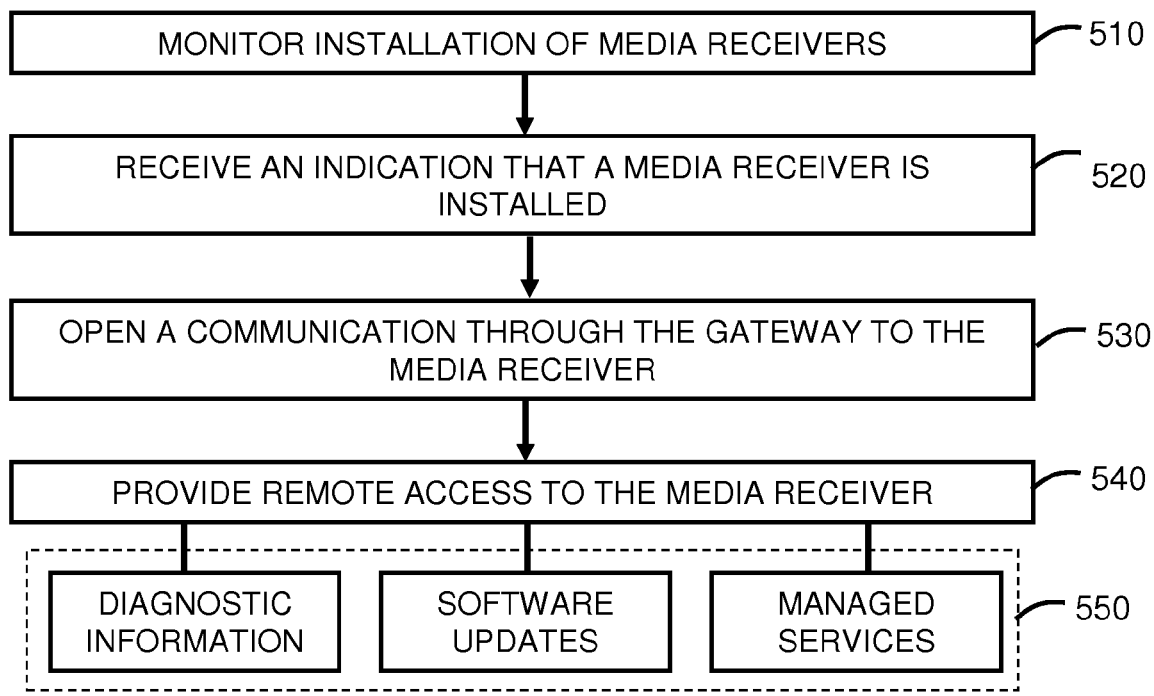

Referring to FIG. 5, a method 500 for provisioning media services is provided. The method 500 can be practiced with more or less than the number of steps shown. Moreover, the steps of the method 500 are not limited to the ordering shown. At step 510, a subsystem of the IPTV media system 100 such as the gateway 104 can monitor the installation of media receivers 106. For example, the gateway 104 can continually check for the installation of media receivers 106 in its network. Alternatively, the portal 230 can perform a similar task by polling the gateway 104 or the media receiver 106 for installation information.

At step 520, the gateway 104 detects by common means that a media receiver 106 has been installed. For example, upon installation, the media receiver 106 can broadcast its presence to the gateway 104 and/or other subsystems of the IPTV media system 100 and thereby request media services. At step 530, the portal 230 can respond to a notice of installation provided by the gateway 104 or media receiver 106 by establishing communications with the media receiver 106 through the gateway. The gateway 104 can have a firewall feature to limit remote access to the media receiver 106. The portal 230 can be provided in step 540 a protected and limited communication link ("a pinhole") through the gateway's firewall to the media receiver 106. The opened communication channel provides a means for remote access applications that can be used to manage operations and services of the media receiver 106 according to a select content module 240 definition. At step 550, the gateway 104 can also open IP ports for remote access applications associated with one or more content modules 240 to manage services, expose diagnostic information or perform automatic software updates.

Upon reviewing the aforementioned embodiments, it would be evident to an artisan with ordinary skill in the art that said embodiments can be modified, reduced, or enhanced without departing from the scope and spirit of the claims described below. For example, there are conceivably many other content modules 240 not described in the present disclosure which can be developed by the service provider of the IPTV media system 100 or the service provider of the portal 230 for controlling or managing operations and services supplied to or provided by the media receiver 106.

Additionally, the portal 230 can be programmed to provide the subscriber a tool kit for developing customized content modules 240 that can perform tasks not yet conceived by service providers of the IPTV media system 100 or portal 230. In another arrangement, the media receiver 106 can represent other mobile or immobile communication devices (e.g., desktop computer, VoIP phone, etc.) with capabilities to receive and process media programs supplied thereto by the IPTV media system 100. The processed media programs can be presented at said communication device or supplied to a media device (e.g., a television or monitor) coupled thereto. These communication devices can also be managed by the portal 230 as accessories by means described earlier.

In yet another arrangement, agents of the IPTV media system 100 can perform service updates to the media receiver 106 without deploying field technicians. Service updates can involve enabling features which a subscriber has requested (e.g., DVR, HDTV, HBO, etc.). The service update can in turn prompt the media receiver 106 to submit an installation notice to the gateway 104 or the portal 230 to inform it of these new services. That in turn can prompt the portal 230 to install a new set of content modules 240 to the derivative account of each subscriber associated with the media receiver 106.

These are but a few examples of modifications that can be applied to the present disclosure without departing from the scope of the claims. Accordingly, the reader is directed to the claims section for a fuller understanding of the breadth and scope of the present disclosure.

Figure 6:
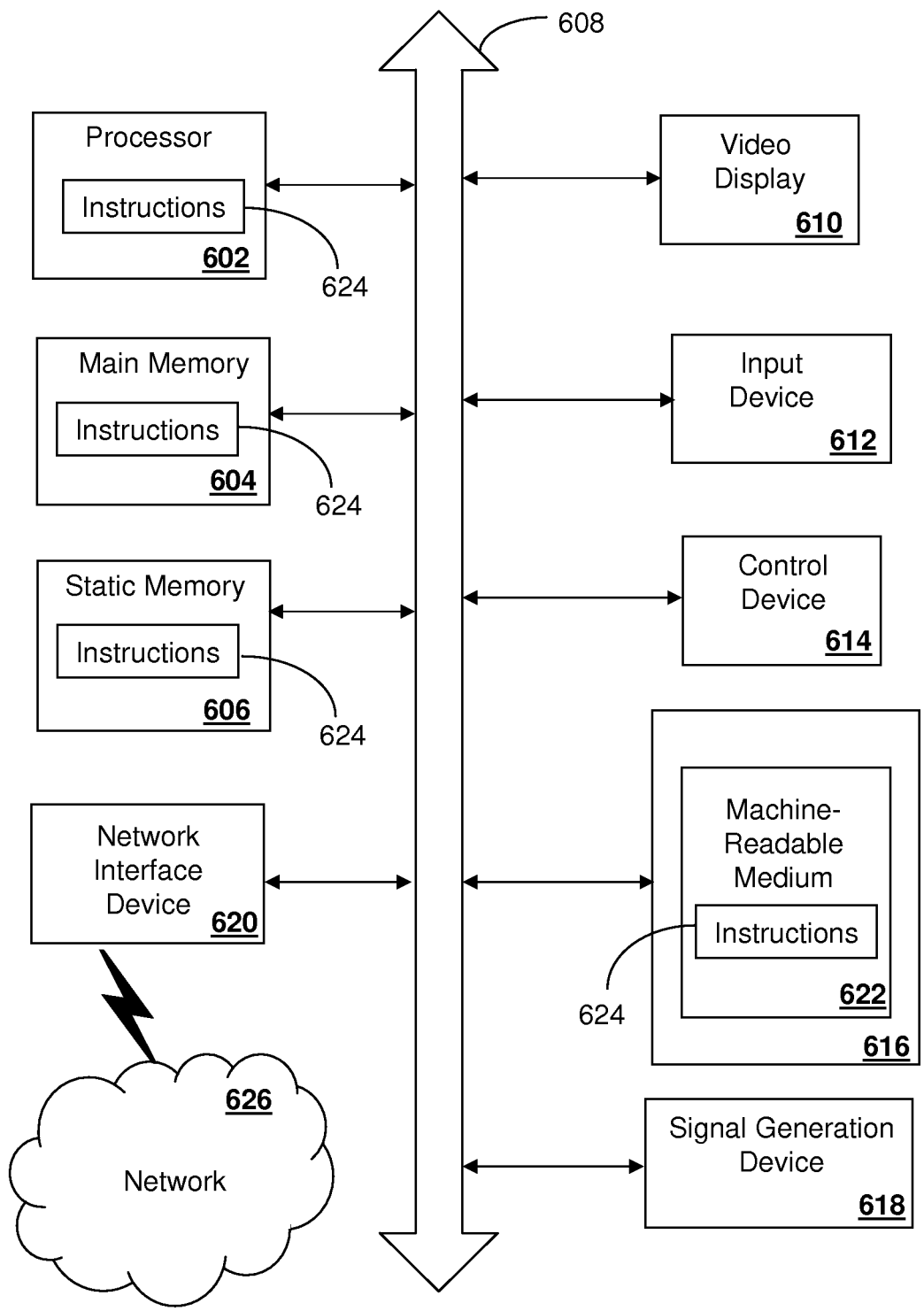
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape. Accordingly, the disclosure is considered to include any one or more of a machine-readable medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, machine-readable storage medium, comprising instructions, wherein responsive to executing the instructions, a processor performs operations comprising:
    detecting an installation of a media receiver in an interactive television media system according to a notice of installation transmitted responsive to a power cycling of the media receiver to produce a detected installation; and
    directing a portal responsive to said detected installation to create a derivative account and to configure a portion of the derivative account according to the installation of the media receiver, wherein the derivative account comprises a customizable web access account based on subscriber information being related to the media receiver and related to the interactive media system.

2. The non-transitory, machine-readable storage medium of claim 1, wherein the operations further comprise directing the portal to configure the portion of the derivative account with one content module.

3. The non-transitory, machine-readable storage medium of claim 2, wherein the one content module corresponds to one of content modules for managing one among a plurality of functions of the media receiver, a plurality of accessories coupled to the media receiver, or a plurality of services supplied to or by the media receiver.

4. The non-transitory, machine-readable storage medium of claim 2, wherein the one content module is selected according to the subscriber information associated with the media receiver.

5. The non-transitory, machine-readable storage medium of claim 2, wherein the one content module is selected according to a recognition of the media receiver.

6. The non-transitory, machine-readable storage medium of claim 1, wherein the portion of the derivative account comprises one of selectable options comprising one of broadcast channel programming, electronic program guide viewing, media program catalog processing, media file processing, media on demand programming, parental control programming, or digital video recorder programming.

7. The non-transitory, machine-readable storage medium of claim 1, wherein the installation of the media receiver comprises one of a first time installation, an installation subsequent to the first time installation, a software update invoked by the media receiver, a software update invoked by a subsystem of the interactive television media system, or a remote update applied to the media receiver by an agent of the interactive television media system.

8. The non-transitory, machine-readable storage medium of claim 1, wherein the media receiver comprises a set-top box managed in part by a media controller for presenting media programs to a media device.

9. The non-transitory, machine-readable storage medium of claim 1, wherein the operations further comprise receiving, from one of the media receiver and a gateway coupled thereto, the notice of installation.

10. The non-transitory, machine-readable storage medium of claim 9, wherein the notice of installation comprises one of an identification of the media receiver or the subscriber information.

11. The non-transitory, machine-readable storage medium of claim 1, wherein the operations further comprise associating a subscriber of media services supplied to the media receiver with the derivative account.

12. A portal, comprising:
    a web server;
    a memory to store instructions; and
    a processor coupled to the memory and the web server, wherein responsive to executing the instructions, the processor performs operations comprising:
        detecting an installation of a media receiver in an interactive television media system according to a notice of installation received by the portal responsive to a power cycling of the media receiver;
        identifying subscription information associated with the media receiver;
        creating a derivative account at the portal based on the subscription information, wherein the derivative account comprises a customizable web access account based on subscriber information being related to the media receiver and related to the interactive television media system;
        adapting the derivative account according to the subscription information; and
        adapting a portion of said portal according to said subscription information.

13. The portal of claim 12, wherein the operations further comprise receiving the notice of installation from one of the media receiver, a gateway coupled to the media receiver, and a subsystem of the interactive television media system, wherein the subsystem of an interactive television media system comprises one of a video head server, a video head office server, or a super head office server, and
    wherein the installation of the media receiver comprises one of a first time installation, an installation subsequent to the first time installation, a software update invoked by the media receiver, a software update invoked by a subsystem of the interactive television media system, or a remote installation update applied to the media receiver by an agent of the interactive television media system.

14. The portal of claim 12, wherein the operations further comprise configuring the portion of the portal with one content module.

15. The portal of claim 14, wherein the operations further comprise:
    retrieving subscriber information associated with the media receiver; and
    selecting the one content module according to said subscriber information.

16. The portal of claim 14, wherein the operations further comprise:
    recognizing the media receiver as recognized media receivers; and
    selecting the one content module according to said recognized media receivers.

17. The portal of claim 14, wherein the one content module manages services supplied by one of the interactive television media system, the media receiver, and accessories coupled to the media receiver.

18. The portal of claim 14, wherein the one content module corresponds to one of a group of content modules for managing a digital video recorder, an electronic program guide, a calendar, a collection of media files stored in the media receiver, a storage system of the media receiver, a media program catalog of the interactive television media system, a media on demand service of the interactive television media system, or parental controls of the media receiver.

19. The portal of claim 14, wherein operations further comprise presenting a graphical user interface element for each of the one content modules.

20. The portal of claim 14, wherein the operations further comprise receiving a directive to cause one of the content modules to be removed, replaced, or modified.

21. The portal of claim 14, wherein the operations further comprise receiving a directive to adapt the portion of the portal with other content modules.

22. The portal of claim 12, wherein the operations further comprise:
receiving selections applied to the portion of the portal; and
managing one of operations of the media receiver, services supplied thereto by the interactive television media system, and accessories coupled to the media receiver according to said selections.

23. An interactive television media receiver, comprising:
a memory to store instructions; and
a processor coupled to the memory, wherein responsive to executing the instructions, the processor performs operations comprising:
generating a notice of installation responsive to a power cycling of the media receiver for a portal to adapt to an installation of the interactive television media receiver;
identifying subscription information associated with the interactive television media receiver;
creating a derivative account at the portal based on the subscription information, wherein the derivative account comprises a customizable web access account based on subscriber information being related to the media receiver and related to the interactive television media receiver;
adapting the derivative account according to the subscription information; and
adapting a portion of said portal according to said subscription information,
wherein the portal operates from a web server providing web services.

24. The interactive television media receiver of claim 23, wherein the processor submits the notice of installation to a gateway coupled to the interactive television media receiver, and wherein the gateway submits the notice of installation to one of the portal and a media system that provides services to the interactive television media receiver.

25. The interactive television media receiver of claim 23, wherein the installation of the interactive television media receiver comprises one of a first time installation, an installation subsequent to the first time installation, a software update invoked by the interactive television media receiver, a software update invoked by a subsystem of a media system, or a remote update performed on the interactive television media receiver by an agent of the media system.

26. The interactive television media receiver of claim 23, wherein the portal is configured with one content module responsive to the notice of installation, wherein the one content module corresponds to one of a group of content modules for managing one of functions of the interactive television media receiver, accessories coupled to the interactive television media receiver, and services supplied to the interactive television media receiver, and
wherein the interactive television media receiver comprises one of a cellular phone, a computer, or a set-top box managed in part by a media controller for presenting media programs to media devices.

27. A gateway, comprising:
a memory to store instructions; and
a processor coupled to the memory, wherein responsive to executing the instructions, the processor performs operations comprising:
submitting a notice of installation responsive to a power cycling of a media receiver associated with the gateway;
identifying subscription information associated with the media receiver;
creating a derivative account at a portal based on the subscription information, wherein the derivative account comprises a customizable web access account based on subscriber information being related to the media receiver and related to the media receiver;
adapting the derivative account according to the subscription information; and
adapting a portion of said portal according to said subscription information,
wherein the notice of installation is associated with an interactive television media receiver coupled to the gateway to enable a portal to adapt to the installation.

28. The gateway of claim 27, wherein the operations further comprise:
detecting an installation of the interactive television media receiver; and
submitting the notice of installation to one of a media system that provides services to the interactive television media receiver, and the portal responsive to said detection.

29. The gateway of claim 27, wherein the portal is configured with one content module responsive to the notice of installation, and wherein the one content module corresponds to one of a group of content modules for managing one of functions of the interactive television media receiver, accessories coupled to the interactive television media receiver, and services supplied to the interactive television media receiver.

30. The gateway of claim 27, wherein the operations comprise receiving the notice of installation from the interactive television media receiver, wherein the installation of the interactive television media receiver comprises one of a first time installation, an installation subsequent to the first time installation, a software update invoked by the interactive television media receiver, a software update invoked by a subsystem of an interactive television media system, or a remote update performed on the interactive television media receiver by an agent of the interactive television media system.

* * * * *